US010436297B2

(12) United States Patent
Takagi et al.

(10) Patent No.: US 10,436,297 B2
(45) Date of Patent: Oct. 8, 2019

(54) OPERATION DEVICE

(71) Applicant: Pioneer DJ CORPORATION, Yokohama-shi, Kanagawa (JP)

(72) Inventors: Nao Takagi, Yokohama (JP); Keitaro Kaburagi, Yokohama (JP); Hiroyuki Endo, Yokohama (JP)

(73) Assignee: PIONEER DJ CORPORATION, Yokohama-Shi (JP)

(*) Notice: Subject to any disclaimer, the term of this patent is extended or adjusted under 35 U.S.C. 154(b) by 15 days.

(21) Appl. No.: 15/745,517

(22) PCT Filed: Jul. 21, 2015

(86) PCT No.: PCT/JP2015/070682
§ 371 (c)(1),
(2) Date: Jan. 17, 2018

(87) PCT Pub. No.: WO2017/013735
PCT Pub. Date: Jan. 26, 2017

(65) Prior Publication Data
US 2018/0216710 A1    Aug. 2, 2018

(51) Int. Cl.
*F16H 25/18* (2006.01)
*G05G 5/04* (2006.01)
(Continued)

(52) U.S. Cl.
CPC ......... *F16H 25/186* (2013.01); *F16H 25/183* (2013.01); *G05G 1/025* (2013.01);
(Continued)

(58) Field of Classification Search
CPC ..... F16H 25/186; F16H 25/183; G05G 1/025; G05G 1/08; G05G 5/03; G05G 5/04; H04H 60/04
See application file for complete search history.

(56) References Cited

U.S. PATENT DOCUMENTS 4,730,788 A * 3/1988 Metcalf ................... B64C 25/50
  244/50
6,641,085 B1 * 11/2003 Delea ...................... B64C 13/04
  244/103 R
(Continued)

FOREIGN PATENT DOCUMENTS

DE    602004000637 T2    2/2007
JP    59-113817            8/1984
(Continued)

OTHER PUBLICATIONS

English translation of International Preliminary Report on Patentability dated Jan. 23, 2018 (dated Jan. 23, 2018), Application No. PCT/JP2015/070682, 6 pages.
(Continued)

*Primary Examiner* — Zakaria Elahmadi
(74) *Attorney, Agent, or Firm* — Rankin, Hill & Clark LLP

(57) ABSTRACT

An operation device includes a stationary portion, a movable portion configured to move in a predetermined direction within a predetermined range, and a load adjuster configured to adjust a movement load of the movable portion. An elastic portion that is elastically deformable is provided to the movable portion. The load adjuster is provided to the stationary portion and provided with a press portion configured to press the elastic portion in a direction intersecting with the moving direction of the movable portion.

4 Claims, 4 Drawing Sheets

(51) Int. Cl.
   *G05G 1/08*    (2006.01)
   *H04H 60/04*   (2008.01)
   *G05G 1/02*    (2006.01)
   *G05G 5/03*    (2008.04)
   *G10H 1/34*    (2006.01)
   *G10H 1/32*    (2006.01)
   *G10H 1/46*    (2006.01)

(52) U.S. Cl.
   CPC .............. *G05G 1/08* (2013.01); *G05G 5/03* (2013.01); *G05G 5/04* (2013.01); *G10H 1/32* (2013.01); *G10H 1/34* (2013.01); *G10H 1/46* (2013.01); *H04H 60/04* (2013.01); *G05G 2505/00* (2013.01)

(56) References Cited

U.S. PATENT DOCUMENTS

| | | | | |
|---|---|---|---|---|
| 9,162,759 B2* | 10/2015 | Hirsch | ............ | B64C 27/001 |
| 2010/0175498 A1* | 7/2010 | Chang | ............ | G05G 1/025 |
| | | | | 74/530 |
| 2010/0288120 A1* | 11/2010 | Penning | ............ | F15B 15/061 |
| | | | | 92/68 |
| 2012/0227521 A1* | 9/2012 | Hsu | ............ | G02B 7/003 |
| | | | | 74/89 |
| 2013/0098183 A1* | 4/2013 | Fever | ............ | E05F 11/481 |
| | | | | 74/89 |
| 2013/0139622 A1* | 6/2013 | Park | ............ | F16H 25/2454 |
| | | | | 74/89.32 |
| 2015/0035658 A1* | 2/2015 | Provancher | ............ | G06F 3/016 |
| | | | | 340/407.1 |
| 2015/0211280 A1* | 7/2015 | Loperfido | ............ | E05F 11/14 |
| | | | | 74/89.17 |
| 2018/0348808 A1* | 12/2018 | Mizukami | ............ | G05G 5/03 |

FOREIGN PATENT DOCUMENTS

| | | |
|---|---|---|
| JP | 60-164642 | 11/1985 |
| JP | H05-056311 A | 3/1993 |
| JP | 2000-074041 A | 3/2000 |
| JP | 2007-074041 A | 3/2000 |
| JP | 2000074041 A * | 3/2000 |
| JP | 2002-008907 | 1/2002 |
| JP | 2006-332074 | 12/2006 |
| JP | 2009-135426 | 6/2009 |
| JP | 2010-166492 A | 7/2010 |
| JP | 4512390 B2 | 7/2010 |

OTHER PUBLICATIONS

International Search Report, dated Oct. 20, 2015 (dated Oct. 20, 2015), 2 pages.

European Search Report dated Feb. 26, 2019, 13 pages.

* cited by examiner

OPERATION DEVICE

TECHNICAL FIELD

The present invention relates to an operation device.

BACKGROUND ART

It has been known that a typical operation device usable in a fader and the like has a structure for adjusting an operation load applied to a movable portion (see, for instance, Patent Literatures 1 and 2).

The operation device of Patent Literature 1 includes: a movable member slidable along a guide shaft; and an adjuster configured to adjust a sliding torque of the movable member. The adjuster includes: a square C-shaped spring provided to a lower end of the movable member; a buffer provided to an inner wall of one of a pair of free ends of the spring; and an adjustment screw connecting the pair of free ends of the spring to each other. In this structure, a distance between the free ends of the spring is adjusted by rotating the adjustment screw, thereby adjusting a friction force between the buffer and the guide shaft, resulting in an adjustment of the sliding torque of the movable member.

The operation device of Patent Literature 2 includes a slide member slidable along a first shaft. The slide member is provided with a plate spring configured to press the slide member onto the first shaft and a cam configured to adjust a pressing force of the plate spring according to a rotation of the cam. In this structure, the pressing force of the plate spring is adjusted according to the rotation of the cam to adjust a pressing force of the slide member applied to the first shaft, resulting in an adjustment of a sliding torque of the slide member.

CITATION LIST

Patent Literature(s)

Patent Literature 1: JP2002-8907A
Patent Literature 2: JP2009-135426A

SUMMARY OF THE INVENTION

Problem(s) to be Solved by the Invention

An operation device (particularly, cross-fader) usable in a DJ device requires a movable portion to be quickly operable, unlike an operation device, for instance, in an audio device (e.g., a fader) usable in a mixing console.

It is crucial to reduce a weight of the movable portion so that the movable portion can be quickly operated. However, since an adjustment mechanism of the sliding torque is provided to the movable portion (i.e., the movable member and the slide member) in the structures disclosed in Patent Literatures 1 and 2, it is difficult to reduce the weight of the movable portion. Notwithstanding, since individuals have their own preference in regard to an operational feeling of the operation device and demand to operate the operation device under load applied to a certain level, the adjustment mechanism of the sliding torque cannot be removed.

Accordingly, in the structures disclosed in Patent Literatures 1 and 2, it is difficult to provide a quickly-operable operation device including the adjustment mechanism of the operation load.

An object of the invention is to provide an operation device capable of a quick operation and an adjustment of an operation load, and a fader including the operation device.

Means for Solving the Problem(s)

According to an aspect of the invention, an operation device includes: a stationary portion; a movable portion configured to move in a predetermined direction within a predetermined range; and a load adjuster configured to adjust a movement load of the movable portion, in which the movable portion is provided with an elastic portion that is elastically deformable, and the load adjuster is provided to the stationary portion and includes a press portion configured to press the elastic portion in a direction orthogonal to a moving direction of the movable portion.

According to another aspect of the invention, a fader includes the operation device according to the above aspect of the invention.

BRIEF DESCRIPTION OF DRAWING(S)

DESCRIPTION OF EMBODIMENT(S)

Exemplary embodiment(s) of the invention will be described below with reference to the attached drawings. An operation device according to an exemplary embodiment is exemplarily used in a fader of a DJ device. For describing directions in FIGS. 1 to 4, a +X direction refers to a front direction (forward), a −X direction refers to a rear direction (backward), a +Y direction refers to a right direction (rightward), a −Y direction refers to a left direction (leftward), a +Z direction refers to a top direction (upward), and −Z direction refers to a bottom direction (downward).

Structure of Operation Device

Figure 1:
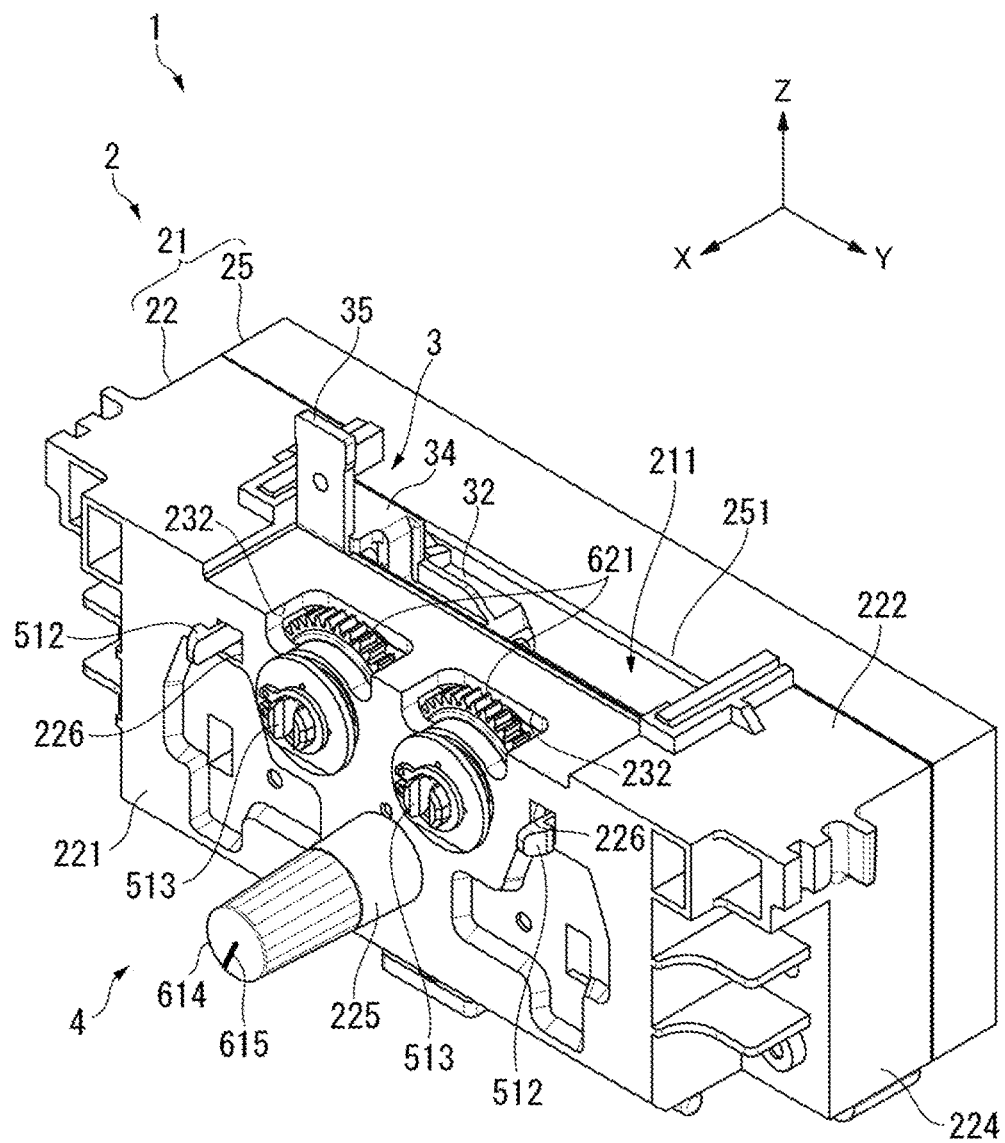
FIG. 1 is a perspective view of an operation device according an exemplary embodiment of the invention.
Figure 2:
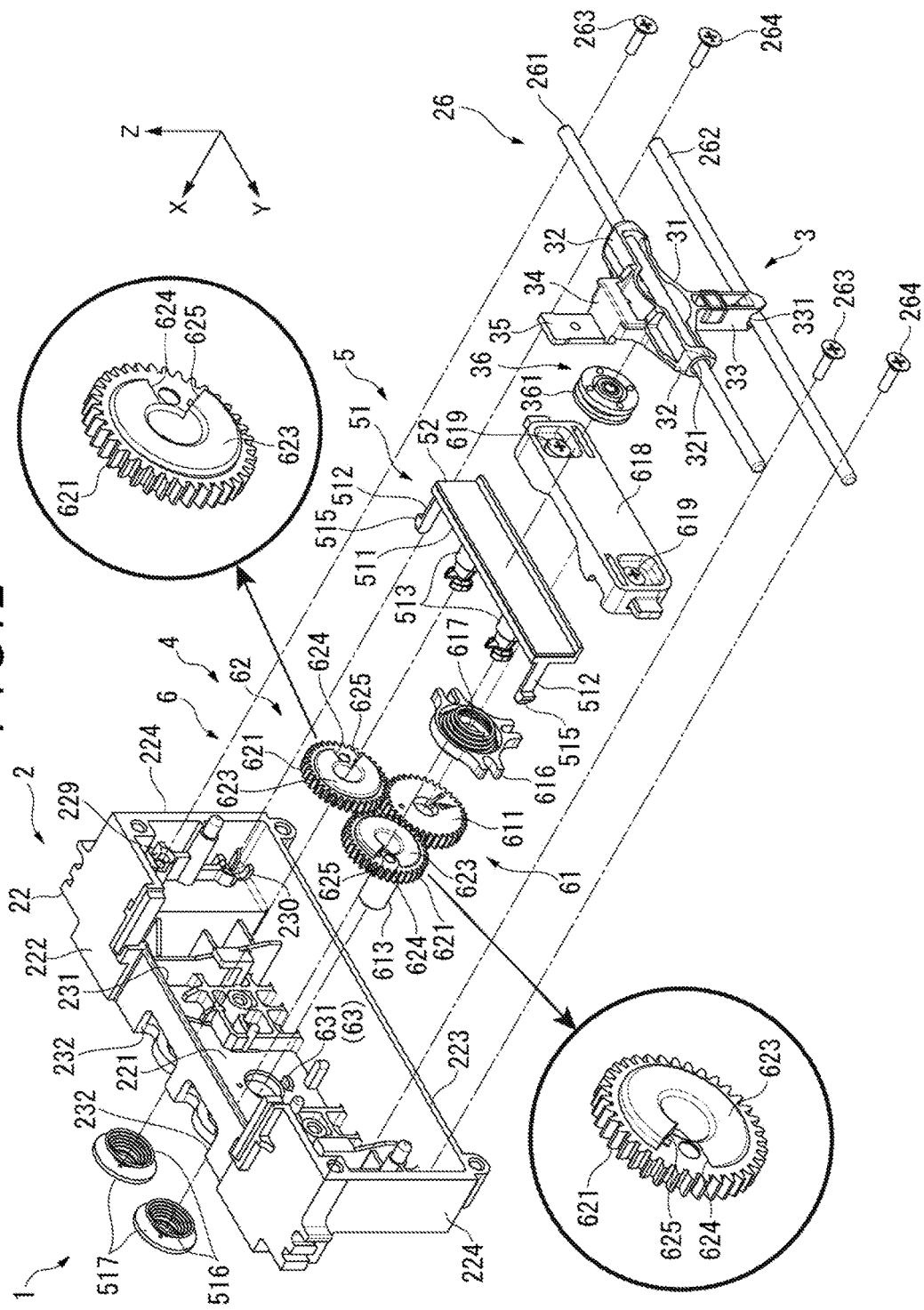
FIG. 2 is an exploded perspective view of the operation device seen from behind.
Figure 3:
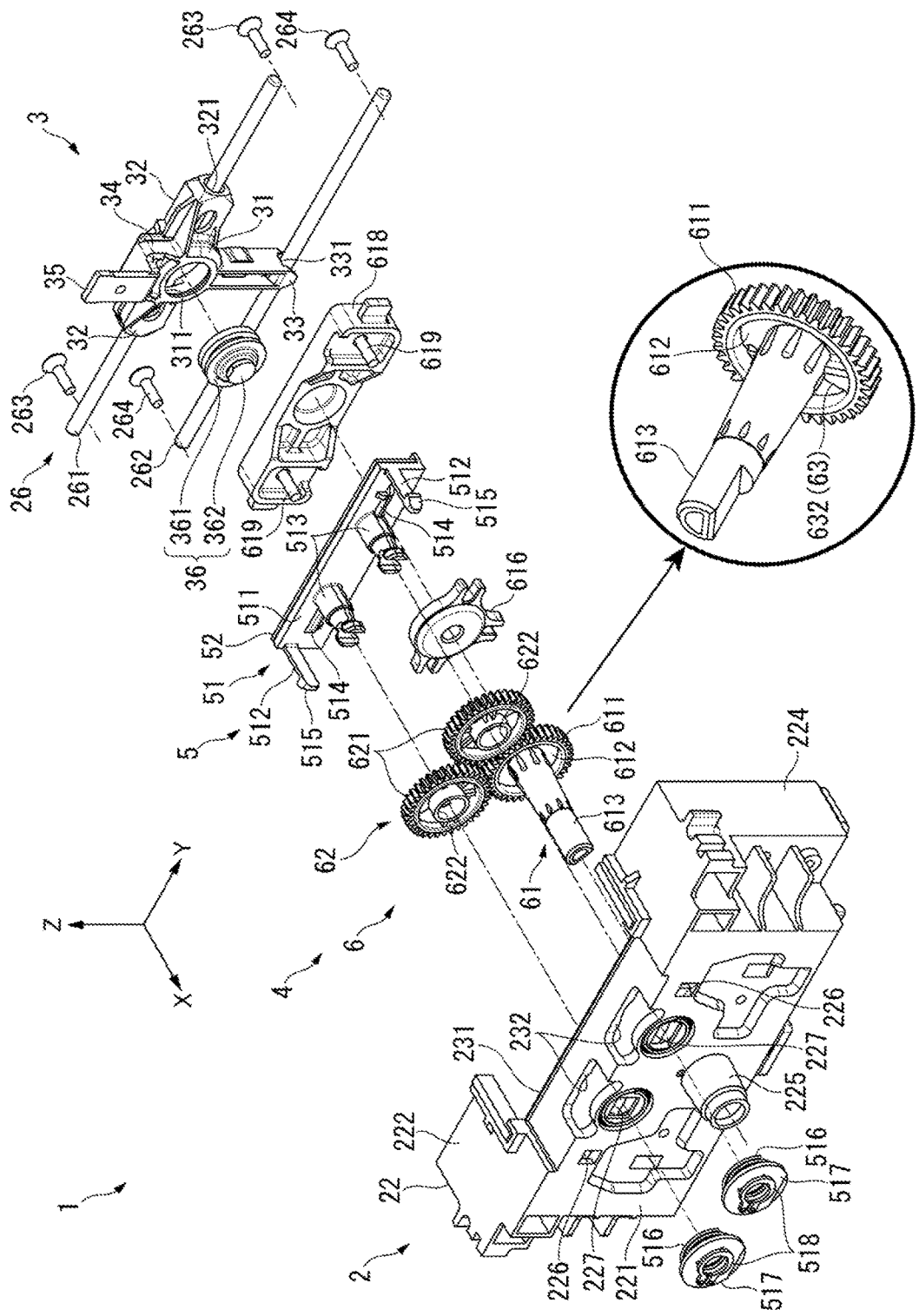
FIG. 3 is an exploded perspective view of the operation device seen from the front.

As shown in FIGS. 1 to 3, an operation device 1 includes a stationary portion 2, a movable portion 3, and a load adjuster 4.

The stationary portion 2 includes a box-shaped casing 21 and a guide 26.

The casing 21 includes a body 22 and a cover 25.

The body 22 is formed of a non-deformable material such as plastic and metal. The body 22, which includes a front portion 221, a top portion 222, a bottom portion 223, and a pair of lateral portions 224, is shaped in a box whose rear portion is opened.

A cylinder 225 is provided to a center of the front portion 221 in the right-left direction. The cylinder 225 projects outward from the front portion 221 of the casing 21 while an inside of the casing 21 intercommunicates with an outside thereof.

Two locking holes 226 are provided in line in the right-left direction above and across the cylinder 225.

Two shaft insertion holes 227 are provided in line in the right-left direction between the two locking holes 226.

On a rear side of the front portion 221, a locking portion 631, two first support grooves 229 (only one of those is shown), and two second support grooves 230 (only one of those is shown) are provided.

The locking portion 631 is provided in a manner to project backward from a side of the front portion 221 below an opening of the cylinder 225. The first support grooves 229 and the second support grooves 230 are provided at backward positions relative to the locking portion 631. Each of the first support grooves 229 is formed in a C-shaped groove whose rear side is opened and is provided on an upper side of each of right and left ends of the front portion 221. Each of the second support grooves 230 is formed substantially in the same shape as each of the first support grooves 229 and is provided under the first support grooves 229.

The top portion 222 has a rectangular cutout 231 near the front portion 221. Through holes 232 are provided on the top portion 222 at positions corresponding to the shaft insertion holes 227.

The cover 25 is formed of a non-deformable material such as plastic and metal into such a shape as being capable of closing the opening of the body 22. A projection 251 capable of being fitted into the cutout 231 of the body 22 is provided at an upper side of the cover 25. The projection 251 is formed in a shape whose length in a projecting direction is shorter than a depth of the cutout of the cutout 231. This structure defines a slit 211 on an upper surface of the casing 21, the slit 211 extending in a moving direction of the movable portion 3 and penetrating the casing 21 so that an inside of the casing 21 intercommunicates with an outside thereof when the cover 25 is fastened to the body 22 with a screw (not shown).

The guide 26 includes a first shaft 261 and a second shaft 262. Both ends of the first shaft 261 are held between the first support grooves 229 and screws 263 attached to the front portion 221, so that the first shaft 261 is fixed in the casing 21. The second shaft 262 is also fixed in the casing 21 by being held between the second support grooves 230 and screws 264 in the same manner as the first shaft 261.

The movable portion 3 is formed of a non-deformable material such as plastic and metal into a cross shape. Specifically, the movable portion 3 includes a central portion 31 having a circular attachment hole 311, two sideward projections 32 respectively projecting rightward and leftward from the central portion 31, a downward projection 33 extending downward from the central portion 31, and an upward projection 34 extending upward from the central portion 31.

A bearing hole 321 is provided at an end in the projecting direction of each of two sideward projections 32. The first shaft 261 is inserted into the bearing holes 321. A bush 322 (see FIG. 4) made of, for instance, a resin is fitted in the bearing hole 321. An inner diameter of the bush 322 is formed slightly larger than a diameter of the first shaft 261 so as to generate almost no friction force between the bush 322 and the first shaft 261.

A bearing groove 331 is provided at an end of the downward projection 33 in the projecting direction. The bearing groove 331, which is formed in a C-shape whose bottom is opened, is formed so as to provide a slight gap between the bearing groove 331 and the second shaft 262 disposed therein.

These structures allow the movable portion 3 held by the stationary portion 2 to be reciprocated in an axial direction of the first shaft 261 and the second shaft 262, when the first shaft 261 inserted in the bearing hole 321 and the second shaft 262 inserted in the bearing groove 331 are fixed in the casing 21.

The upward projection 34 is formed in such a shape as to project through the slit 211 when the movable portion 3 is fixed to the stationary portion 2. The upward projection 34 has an attachment portion 35 extending upward. An operational knob (not shown) is attached to the attachment portion 35.

An elastic portion 36, which is elastically deformable, is provided to the movable portion 3. The elastic portion 36 includes an elastic member 361 and a non-elastic member 362.

The elastic member 361, which is formed of an elastically deformable material (e.g., rubber) in a substantially cylindrical shape, is capable of being fitted into the attachment hole 311.

The non-elastic member 362 is formed of a material incapable of elastic deformation (e.g., plastics) in a cylindrical shape having a closed front end. The non-elastic member 362 is fitted in the elastic member 361 with the front end of the non-elastic member 362 projecting beyond the elastic member 361.

The load adjuster 4 is provided to the stationary portion 2. The load adjuster 4 includes a press portion 5 and an adjustment controller 6.

The press portion 5 includes a holding member 51 and a contact member 52.

The holding member 51 includes a rectangular plate 511. Two engagement portions 512, two shafts 513, and two contact projections 514 are provided on a first surface of the plate 511.

The engagement portions 512 are provided on both longitudinal ends of the plate 511. Each of the engagement portions 512 is shaped in a stick having a claw 515 at an end.

The shafts 513 each shaped in a column are provided in line in the right-left direction between the engagement portions 512.

The contact projections 514 respectively extend toward the engagement portions 512 from bases of the shafts 513.

The contact member 52 (e.g., a felt) formed in a thin plate is attached to a second surface of the plate 511. The contact member 52 is configured to be brought into contact with the non-elastic member 362 of the elastic portion 36 to apply friction force to the non-elastic member 362.

The adjustment controller 6 includes a rotational portion 61, two convertors 62, and a rotation restricting portion 63.

The rotational portion 61 includes a first gear 611. A recess 612 is provided on a first surface of the first gear 611. The recess 612 is formed in a circle concentric with the first gear 611. A knob attachment portion 613 shaped in a cylinder projects from the center of the recess 612. The knob attachment portion 613 is shaped so that the knob attachment portion 613 is capable of being inserted through the cylinder 225 and an end of the knob attachment portion 613 projects beyond the cylinder 225. An adjusting knob 614 having an indicating line 615 is attachable to the projecting end of the knob attachment portion 613. The adjusting knob 614 is provided in a manner to be exposed to an outside of a fader (final product) in which the operation device 1 is installed.

A single locked portion 632 extending outward in a radial direction of the first gear 611 from a base of the knob attachment portion 613 is provided in the recess 612.

Each of the convertors 62 includes a second gear 621. A shaft insertion hole 622 into which each of the shafts 513 is capable of being inserted is provided at the center of the second gear 621. A pressing-force adjusting projection 623 is provided on one surface of the second gear 621. The pressing-force adjusting projection 623 is shaped in a major arc along a circumferential direction of the second gear 621. The pressing-force adjusting projection 623 has a bottom 624 defined at one circumferential end and a top 625 defined at the other circumferential end. The pressing-force adjusting projection 623 is inclined from the bottom 624 to the top 625 so that the top 625 becomes increasingly remote from the one surface of the second gear 621.

The rotation restricting portion 63 includes the locking portion 631 provided to the body 22 and the locked portion 632 provided to the first gear 611.

The rotational portion 61 and the convertors 62 are attached to the body 22 as follows. It should be noted that the rotational portion 61 and the convertors 62 may be attached in any order.

Firstly, for attachment of the rotational portion 61 to body 22, the knob attachment portion 613 is inserted through the cylinder 225 so that the locking portion 631 is positioned inside the recess 612 of the first gear 611. Next, an intermediate member 616, a spring 617, and an operating-portion attachment member 618 are layered on a second surface of the first gear 611. A screw 619 is attached to the body 22 in a manner to penetrate the operating-portion attachment member 618.

This structure allows the rotational portion 61 to be held by the body 22 in a manner to be rotatable in a range where the locking portion 631 is in no contact with the locked portion 632 and to be restrained from being rotated when the locking portion 631 is in contact with the locked portion 632. In other words, the rotational angle of the rotational portion 61 is restricted to less than 360 degrees by the rotation restricting portion 63. Moreover, the rotational portion 61 held in this state is pressed onto the front portion 221 by a biasing force of the spring 617.

On the other hand, for attachment of the convertors 62 to the body 22, the shafts 513 of the holding member 51 are inserted through the corresponding shaft insertion holes 622 of the second gears 621. Next, the engagement portions 512 and the shafts 513 are respectively inserted through the locking holes 226 and the shaft insertion holes 227 of the body 22 so that the second gears 621 mesh with the first gear 611. Since this insertion allows the claw 515 of each of the engagement portions 512 to be locked on a circumferential edge of the corresponding locking hole 226 when the holding member 51 is moved in a direction away from the front portion 221, the holding member 51 can be restrained from being removed from the body 22.

Subsequently, each of the shafts 513 projecting from the front portion 221 is inserted through a spring 516. After that, while an end of each of the shafts 513 is elastically deformed, each of the shafts 513 is inserted through a pressed member 517 and is inserted through a retaining member 518. This insertion allows the pressed member 517 and the retaining member 518 to be positioned at a neck provided on the end of each of the shafts 513, so that the shafts 513 are restrained from slipping off the corresponding shaft insertion holes 227. Moreover, the spring 516 biases the pressed member 517 toward the outside of the body 22 to press the holding member 51 onto the second gear 621. As a result, a part of the pressing-force adjusting projection 623 of the second gear 621 is constantly kept in contact with each of the contact projections 514 of the holding member 51.

Operation of Operation Device

Next, an adjustment mechanism of an operation load will be described with respect to an operation of the operation device 1.

The adjustment mechanism, in which a swash plate cam mechanism is used, is configured to reciprocate the contact member 52 in parallel with a rotation axis of the adjusting knob 614 by rotating the adjusting knob 614 to rotate the pressing-force adjusting projection 623 (i.e., a rotary swash plate) connected to the adjusting knob 614.

Figure 4:
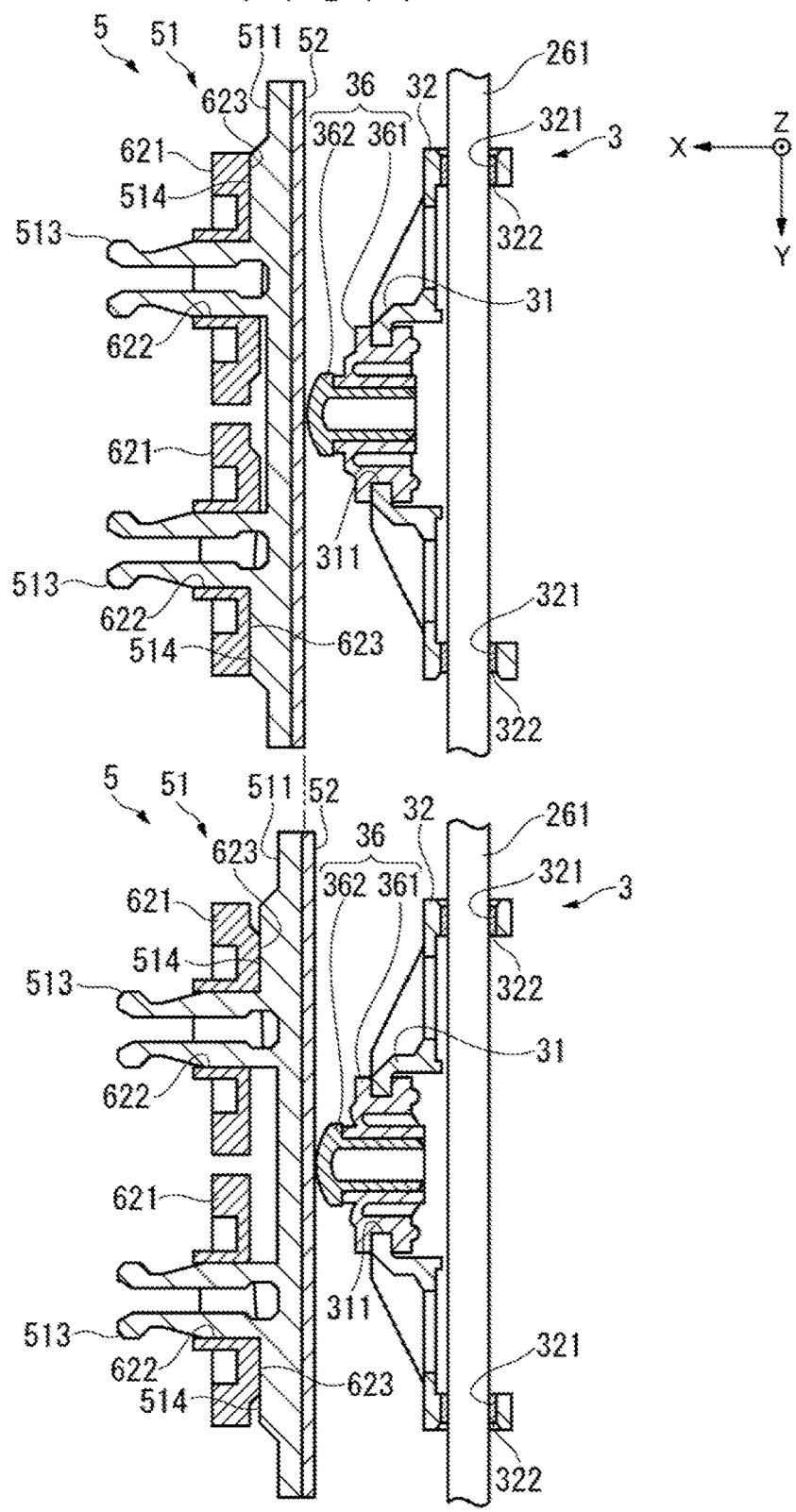
FIG. 4 is an illustration explaining an operation-load adjustment method.

For instance, when the contact between the locking portion 631 and the locked portion 632 restricts the leftward (anticlockwise) rotation of the adjusting knob 614, as shown in an upper drawing in FIG. 4, the holding member 51 is pressed onto the second gear 621 by the biasing force of the spring 516, so that the bottom 624 of the pressing-force adjusting projection 623 is brought into contact with the contact projections 514 of the holding member 51 and the contact member 52 is remote from the elastic portion 36. For this reason, a backward pressing force is not applied to the movable portion 3, so that the bush 322 is not pressed onto the first shaft 261. Consequently, no friction force is caused between the bush 322 and the first shaft 261, so that almost no operation load is applied to the movable portion 3.

When the adjusting knob 614 is rotated rightward (clockwise) from the state shown in the upper drawing of FIG. 4, the second gear 621 is rotated anticlockwise, whereby the contact position between the pressing-force adjusting projection 623 and the contact projections 514 is moved from the bottom 624 toward the top 625. In conjunction with the movement of the contact position, the holding member 51 is moved backward to contact the contact member 52 with the elastic portion 36. Subsequently, when the adjusting knob 614 is further rotated clockwise, as shown in a lower drawing of FIG. 4, the holding member 51 is further moved backward to cause the contact member 52 to press the elastic portion 36 in a direction orthogonal to the moving direction of the movable portion 3. At this time, the elastic member 361 of the elastic portion 36 is elastically deformed to moderate the pressing force to cause the bush 322 of the movable portion 3 to be pressed onto the first shaft 261. Consequently, a friction force according to the pressing force is generated between the bush 322 and the first shaft 261 to apply a load against moving the movable portion 3 (hereinafter, this load is occasionally referred to as a movement load).

As the adjusting knob 614 is increasingly rotated clockwise, the movement load of the movable portion 3 is increased. When the locking portion 631 is brought into contact with the locked portion 632 to restrict the clockwise rotation of the adjusting knob 614, the top 625 of the pressing-force adjusting projection 623 is brought into contact with the contact projections 514 of the holding member 51. As a result, the movement load of the movable portion 3 reaches the maximum.

On the other hand, as the adjusting knob 614 is increasingly rotated anticlockwise, the movement load of the movable portion 3 is decreased.

Advantage(s) of Embodiment(s)

As described above, the load adjuster 4 of the operation device 1 includes the press portion 5 provided to the stationary portion 2. The press portion 5 presses the elastic portion 36 provided to the movable portion 3 in the direction orthogonal to the moving direction of the movable portion 3, thereby applying the movement load to the movable portion 3.

As described above, the movable portion 3 only includes the elastic portion 36 and the stationary portion 2 includes the press portion 5 having a complicated structure in order to adjust the operation load of the operation device 1.

Accordingly, a weight of the movable portion 3 is reducible without impairing the function of adjusting the operation load.

Moreover, when the press portion 5 presses the elastic portion 36, the movable portion 3 is pressed onto the guide 26 by the pressing force moderated by the elastic deformation of the elastic portion 36. Accordingly, as compared with a case where the press portion 5 presses a movable portion incapable of elastic deformation, the press portion 5 can gradually apply the pressing force to the movable portion 3, so that the operation load can be finely adjusted.

Consequently, the operation device 1 capable of a quick operation and the fine adjustment of the operation load can be provided.

In addition, since the press portion 5 is provided in the stationary portion 2, a layout and a structure design of the press portion 5 can be more freely determined and an amount of the press portion 5 to be moved by the load adjuster 4 can be determined to be large, so that the elastic portion 36 can be sufficiently elastically deformed. Accordingly, a material having a low elastic coefficient is usable for the elastic member 361 of the elastic portion 36, so that a fine adjustment of the operation load can be easily made.

It should be noted that "the moving direction of the movable portion 3 and the pressing direction of the press portion 5 are orthogonal to each other" not only means that an angle formed by the moving direction and the pressing direction is exactly 90 degrees, but also allows a slight deviation from the 90 degrees.

The load adjuster 4 includes the adjustment controller 6 capable of moving the press portion 5 to and away from the elastic portion 36.

Accordingly, without using a member independent of the operation device 1 (e.g., a driver), the fine adjustment of the operation load can be easily and quickly made. Particularly, since the adjusting knob 614 is exposed to the outside of the fader (i.e., the final product), a user can adjust the operation load while operating the movable portion 3 and can easily make the fine adjustment of the operation load according to an individual preference.

Further, the adjustment controller 6 includes: the convertors 62 configured to convert the rotational movement of the rotational portion 61 into a linear movement to move the press portion 5 forward and backward; and the rotation restricting portion 63 configured to restrict the rotational angle of the rotational portion 61 to less than 360 degrees.

Further, since the indicating line 615 is set on the adjusting knob 614 in addition to the aforementioned restriction of the rotation of the rotational portion 61, the user can easily understand the current adjustment state of the operation load.

Moreover, the adjustment controller 6 transmits the pressing force to the press portion 5 through parts of the press portion 5 corresponding to the two convertors 62.

For instance, when the pressing force is transmitted to the contact member 52 using a single convertor 62, the contact member 52 may be tilted.

However, when two convertors 62 are used for transmitting the pressing force to the contact member 52, the contact member 52 can be restrained from being tilted.

The elastic portion 36 includes: the elastic member 361 provided in the movable portion 3; and the non-elastic member 362 provided to the elastic member 361 and configured to be brought into contact with the press portion 5.

As compared with a structure that the elastic member 361 is brought into contact with the press portion 5, since the non-elastic member 362 harder than the elastic member 361 is configured to be brought into contact with the press portion 5, the elastic portion 36 can be restrained from being broken by the friction force generated between the non-elastic member 362 and the press portion 5 during the movement of the movable portion 3.

Especially, since the elastic member 361 is formed of elastically deformable rubber, the elastic member 361 can be in a tight contact with a contact part of the movable portion 3 and a contact part of the non-elastic member 362. Accordingly, during the movement of the movable portion 3, the elastic member 361 can be restrained from being displaced relative to the movable portion 3 while the non-elastic member 362 can be restrained from being displaced relative to the elastic member 361. Consequently, the user can comfortably make a DJ performance.

Modification(s)

The invention is no means by limited only to the above exemplary embodiment, but may include various improvements and design modifications without deviating from the scope of the invention.

Although the adjusting knob 614 is used to rotate the first gear 611 in the above exemplary embodiment, for instance, a screwdriver may be used to rotate the first gear 611.

Although the first gear 611 and the second gear 621 having the pressing-force adjusting projection 623 are used to move the press portion 5 forward and backward with respect to the elastic portion 36, a pinion and a rack configured to move forward and backward in conjunction with a rotation of the pinion may be used.

Further, the rotation restricting portion 63 is not necessarily provided and the rotational angle of the rotational portion 61 is not necessarily restricted to less than 360 degrees.

Furthermore, three or more convertors 62 may be provided. Alternatively, a single convertor 62 may be provided.

The elastic member 361 may be formed of an elastically deformable material such as a coil spring, a plate spring, or sponge in addition to the rubber.

The non-elastic member 362 is not necessarily provided.

Moreover, although only a single elastic member 361 is provided in the elastic portion 36, a plurality of elastic members may be provided in a direction in which the elastic portion 36 is pressed, whereby the pressing force of the contact member 52 may be stepwise moderated by the plurality of elastic members.

The operation device of the invention may be used in a DJ mixer, a DJ player and an audio effector or may be used in products other than DJ devices, such as a music player, a game device and electric home appliances.

The invention claimed is:

1. A fader comprising:
a stationary portion;
a movable portion configured to move along an axial direction of a shaft fixed to the stationary portion; and
a load adjuster configured to adjust a movement load of the movable portion, wherein
the movable portion is provided with an elastic portion that is elastically deformable, and
the load adjuster is provided to the stationary portion and comprises an adjustment controller and a press portion, said adjustment controller comprising:
a rotational portion capable of being rotated;
a plurality of converters, each of said plurality of converters being configured to convert a rotational movement of the rotational portion into a linear movement;

wherein the adjustment controller is configured to move the press portion toward and away from the elastic portion; and, wherein the press portion is configured to press the elastic portion in accordance with each of the linear movements in a direction orthogonal to a moving direction of the movable portion.

2. The fader according to claim 1, wherein the adjustment controller is exposed to an outside of a final product in which the fader is installed.

3. The fader according to claim 1, wherein the adjustment controller comprises: a rotation restricting portion configured to restrict a rotational angle of the rotational portion to less than 360 degrees.

4. The fader according to claim 1, wherein the elastic portion comprises: an elastic member provided to the movable portion; and a non-elastic member provided to the elastic member and configured to be brought into contact with the press portion.

* * * * *